(12) United States Patent
Gupta et al.

(10) Patent No.: US 9,772,939 B2
(45) Date of Patent: Sep. 26, 2017

(54) HEAT-BASED KEY-VALUE SLOT ORGANIZATION FOR FLASH-OPTIMIZED DATA PLACEMENT IN MULTI-TIERED STORAGE SYSTEMS

(71) Applicant: INTERNATIONAL BUSINESS MACHINES CORPORATION, Armonk, NY (US)

(72) Inventors: Aayush Gupta, San Jose, CA (US); Sangeetha Seshadri, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 37 days.

(21) Appl. No.: 14/589,121

(22) Filed: Jan. 5, 2015

(65) Prior Publication Data

US 2016/0196207 A1    Jul. 7, 2016

(51) Int. Cl.
*G06F 12/02* (2006.01)
*G06F 3/06* (2006.01)

(52) U.S. Cl.
CPC ........ *G06F 12/0246* (2013.01); *G06F 3/0616* (2013.01); *G06F 3/0644* (2013.01); *G06F 3/0652* (2013.01); *G06F 3/0688* (2013.01); *G06F 2212/7206* (2013.01)

(58) Field of Classification Search
CPC .... G06F 3/0604; G06F 3/0639; G06F 3/0679; G06F 12/0246; G06F 2212/7206
USPC ......................................................... 711/103
See application file for complete search history.

(56) References Cited

U.S. PATENT DOCUMENTS

| | | | |
|---|---|---|---|
| 2011/0238892 A1* | 9/2011 | Tsai ..................... | G11C 16/349 711/103 |
| 2012/0072654 A1 | 3/2012 | Olbrich et al. | |
| 2012/0297122 A1 | 11/2012 | Gorobets et al. | |
| 2013/0024599 A1 | 1/2013 | Huang et al. | |
| 2014/0281260 A1* | 9/2014 | Peterson .............. | G06F 3/0616 711/135 |
| 2015/0160862 A1* | 6/2015 | Blott ..................... | G06F 3/0604 711/148 |
| 2015/0169237 A1* | 6/2015 | Ioannou ................ | G06F 3/0679 711/103 |

FOREIGN PATENT DOCUMENTS

WO    2012054223 A2    4/2012

OTHER PUBLICATIONS

Park, et al., "Hot Data Identification for Flash-Based Storage Systems Using Multiple Bloom Filters" pp. 1-11, 27th Symposium on Mass Storage Systems and Technologies (MSST), IEEE, 2011.

(Continued)

*Primary Examiner* — Gary Portka
(74) *Attorney, Agent, or Firm* — Griffiths & Seaton PLLC (57) ABSTRACT

For flash-optimized data placement in multi-tiered, log-structured storage systems, based on at least one key-level data heat metric, sets of key-value pairs determined to exhibit similar data heat characteristics are grouped. Those key-value pairs exhibiting a hotter data heat characteristic are placed into a separate flash memory log-structured data container than those key-value pairs exhibiting a colder data heat characteristic.

18 Claims, 4 Drawing Sheets

(56) References Cited

OTHER PUBLICATIONS

Haas, et al., "The Fundamental Limit of Flash Random Write Performance: Understanding, Analysis and Performance Modelling", Mar. 31, 2010, 15 pages, IBM Research Report.
Jung, et al., "A Process-Aware Hot/Cold Identification Scheme for Flash Memory Storage Systems" pp. 339-347, IEEE Transactions on Consumer Electronics 56, No. 2, 2010.
Park, et al., "HotDataTrap: A Sampling-Based Hot Data Identification Scheme for Flash Memory" pp. 1610-1617, Proceedings of the 27th Annual ACM Symposium on Applied Computing, ACM, 2012.
Tijoe et al., "Making Garbage Collection Wear Conscious for Flash SSD" pp. 114-123, 2012 IEEE 7th International Conference on Networking, Architecture and Storage (NAS), IEEE, 2012.

* cited by examiner

HEAT-BASED KEY-VALUE SLOT ORGANIZATION FOR FLASH-OPTIMIZED DATA PLACEMENT IN MULTI-TIERED STORAGE SYSTEMS

BACKGROUND OF THE INVENTION

Field of the Invention

The present invention relates in general computing systems, and more particularly to, systems and methods for increased data management efficiency in computing storage environments.

Description of the Related Art

In today's society, computer systems are commonplace. Computer systems may be found in the workplace, at home, or at school. Computer systems may include data storage systems, or disk storage systems, to process and store data. Data storage systems may include multiple storage devices that are configured in a tiered arrangement, such that more-frequently used data may be placed on a tier having greater storage performance (e.g., such as Solid State Drive (SSD) devices), while lesser-used data may be relegated to Hard Disk Drives (HDDs).

SUMMARY OF THE INVENTION

Existing data storage systems may implement key/value stores to manage the storage of Key/Value pairs, such as those pairs in a particular Key/Value database. Because of the generally large granularity of tiered storage mechanisms in conventional data storage environments, these key/value stores may co-locate so-called "hot" data (e.g., data frequently accessed and/or changed and/or in relatively higher importance) and so-called "cold" data (e.g., data less frequently accessed and or changed and/or in relatively lesser importance) in the same region. Such co-location may result in data management inefficiencies for data placement in certain storage media, such as flash which incurs a high garbage collection overhead, and in tiering systems in general, where cold key/value pairs take up space in a storage tier having scarce resource availability (e.g., SSD tier), and hot key/value pairs are placed on generally slower performing storage media (e.g., HDD or tape devices), for example.

In view of the foregoing, a mechanism to address the co-location of hot and cold key/value pairs in tiered storage environments such that hot key/value pairs are located in a similar region, and colder key/value pairs are also located in a similar region, is desirable. In particular, a mechanism whereby hotter key/value pairs are co-located to optimize tiered storage environments having flash-based storage devices, is desirable.

To address this need, various embodiments for flash-optimized data placement in multi-tiered storage systems are provided. In one such embodiment, a method for flash-optimized data placement in multi-tiered storage systems by a processor is disclosed. Based on at least one key-level data heat metric, sets of key-value pairs determined to exhibit similar data heat characteristics are grouped. Those key-value pairs exhibiting a hotter data heat characteristic are placed into a separate flash memory data container than those key-value pairs exhibiting a colder data heat characteristic.

Other system and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As mentioned previously, existing data storage systems may implement key/value stores to manage the storage of Key/Value pairs, such as those pairs in a particular Key/Value database. Because of the generally large granularity of tiered storage mechanisms in conventional data storage environments, these key/value stores may co-locate so-called "hot" data (e.g., data frequently accessed and/or changed and/or in relatively higher importance) and so-called "cold" data (e.g., data less frequently accessed and or changed and/or in relatively lesser importance) in the same region. Such co-location may result in data management inefficiencies for data placement in certain storage media, such as flash, and in tiering systems in general, where cold key/value pairs take up space in a storage tier having scarce resource availability (e.g., SSD tier), and hot key/value pairs are placed on generally slower performing storage media (e.g., HDD or tape devices), for example.

In view of the foregoing, a mechanism to address the co-location of hot and cold key/value pairs in tiered storage environments such that hot key/value pairs are located in a similar region, and colder key/value pairs are also located in a similar region, is desirable. In particular, a mechanism whereby hotter key/value pairs are co-located to optimize tiered storage environments having flash-based storage devices, is desirable.

To address this need, various mechanisms for flash-optimized data placement in multi-tiered storage systems are provided. In one such example, a method for flash-optimized data placement in multi-tiered storage systems by a processor is disclosed. Based on at least one key-level data heat metric, sets of key-value pairs determined to exhibit similar data heat characteristics are grouped. Those key-value pairs exhibiting a hotter data heat characteristic are placed into a separate flash memory data container than those key-value pairs exhibiting a colder data heat characteristic.

By "granularizing" tiered storage functionality into a key/value level, the aforementioned challenge of co-location of hot and cold key/value pairs is eliminated. In this manner, hot key/value pairs are assigned to higher performing storage media. By maintaining the hot key/value pairs on high-performing storage media, the overall data processing performance is increased. Likewise, colder key/value pairs are relegated to lesser, and less expensive, storage media, which saves system resources and lowers cost. As a result, the entire storage environment benefits by being able to achieve greater efficiencies of operation.

Figure 1:
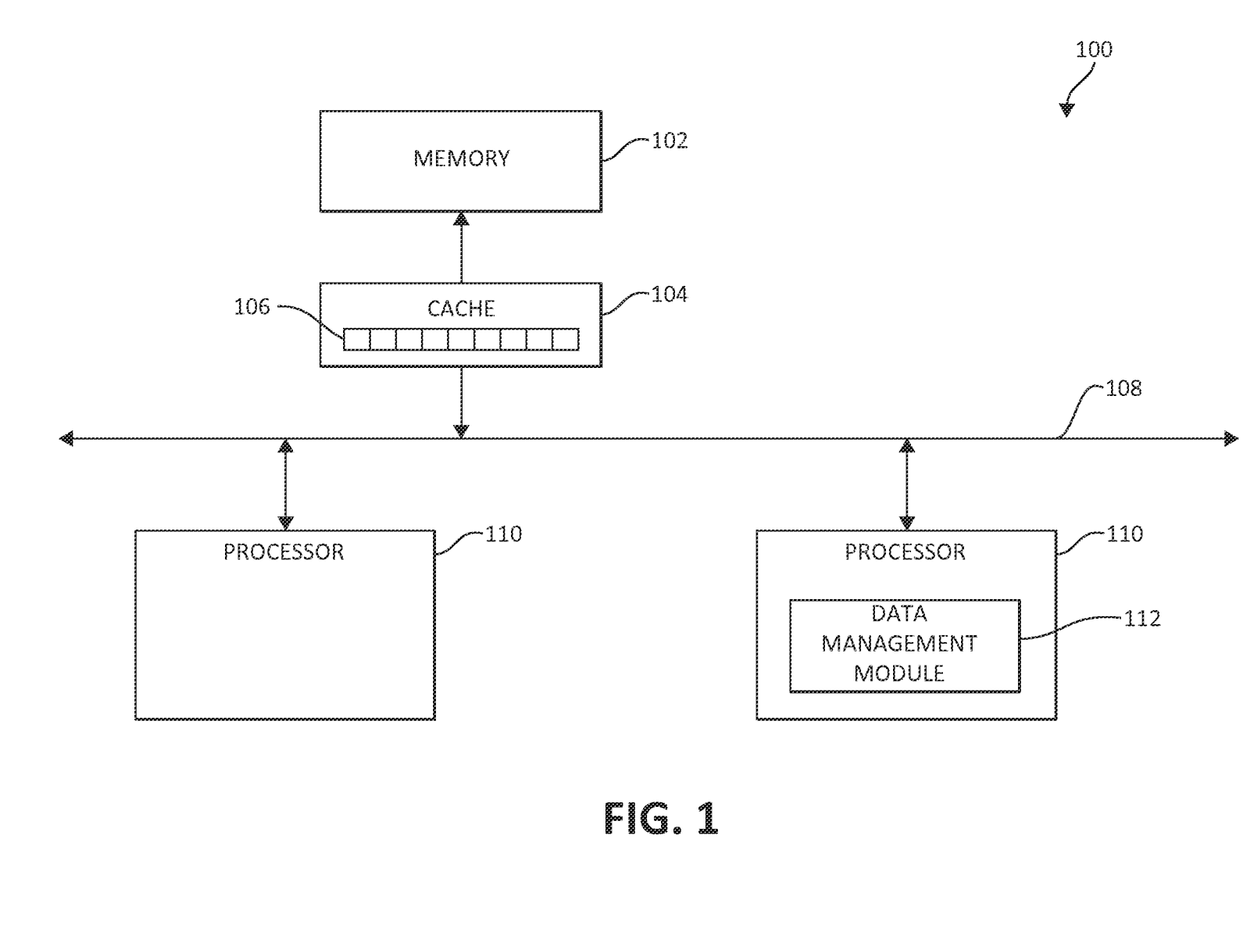
FIG. 1 is an exemplary block diagram showing a hardware structure for data management in which aspects of the present invention may be realized.

Turning to FIG. 1, a block diagram of one embodiment of a system 100 for data management incorporating various aspects of the present invention is illustrated. At least in the illustrated embodiment, system 100 comprises a memory 102 coupled to a cache 104 and a processor 110 via a bus 108 (e.g., a wired and/or wireless bus).

Memory 102 may be any type of memory device known in the art or developed in the future. Examples of memory 102 include, but are not limited to, an electrical connection having one or more wires, a portable computer diskette, a hard disk, a random access memory (RAM), an erasable programmable read-only memory (EPROM or Flash memory), an optical fiber, a portable compact disc read-only memory (CD-ROM), an optical storage device, a magnetic storage device, or any suitable combination of the foregoing. In the various embodiments of memory 102, storage tracks are capable of being stored in memory 102. Furthermore, each of the storage tracks can be staged or destaged from/to memory 102 from cache 104 when data is written to the storage tracks.

Cache 104, in one embodiment, comprises a write cache partitioned into one or more ranks 106, where each rank 106 includes one or more storage tracks. Cache 104 may be any cache known in the art or developed in the future.

In various embodiments, processor 110 comprises or has access to a data management module 112, which comprises computer-readable code that, when executed by processor 110, causes processor 110 to perform data management operations in accordance with aspects of the illustrated embodiments. In the various embodiments, processor 110 performs flash-optimized data placement for a multi-tiered storage system by grouping sets of key-value pairs based on at least one key-level data heat metric, where those key-value pairs exhibiting a hotter data heat characteristic are placed into a separate flash memory data container than those key-value pairs exhibiting a colder data heat characteristic.

In other embodiments, processor 110 groups those key-value pairs determined to have similar data heat characteristics into a same one of multiple flash memory log-structured containers, each of the containers corresponding to a specific data heat in a heat gradient.

In other embodiments, processor 110 effects key-value pair groupings for key-value pairs of any conceivable size.

In other embodiments, processor 110 establishes a key-level data heat metric as a function of an update frequency, an access frequency, or an arrival time of a respective key-value pair.

In other embodiments, processor 110 monitors the respective key-value pair over time to determine a data heat characteristic for the respective key-value pair.

In other embodiments, processor 110 maintains grouped sets of key-value pairs as entries in a memtable.

In still other embodiments, processor 110 implements an aging protocol for the entries of key-value pairs, where lower priority entries are evicted to a particular memory data container based on at least one of the data heat characteristics.

Finally, in still other embodiments, processor 110 flushes the entries in the memtable as part of a subsequent garbage collection operation.

Figure 2:
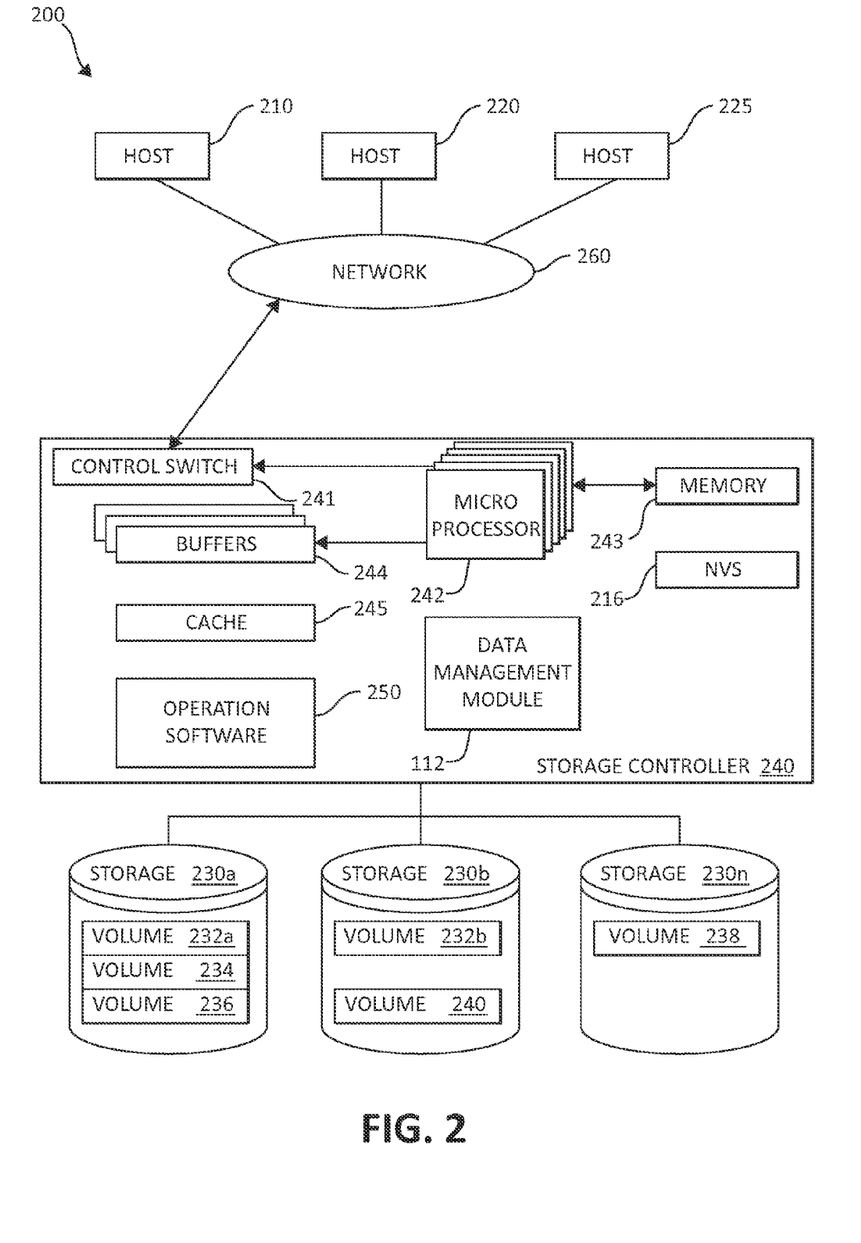
FIG. 2 is an exemplary block diagram showing a hardware structure of a data storage system in a computer system according to the present invention in which aspects of the present invention may be realized.

Turning now to FIG. 2, a block diagram 200 illustrating an exemplary hardware structure of a data storage system in which aspects of the present invention may be implemented, is shown. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. A Network (e.g., storage fabric) connection 260 may be a fibre channel fabric, a fibre channel point-to-point link, a fibre channel over ethernet fabric or point to point link, a FICON or ESCON I/O interface. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Moreover, given the use of the storage fabric network connection 260, additional architectural configurations may be employed by using the storage fabric 260 to connect multiple storage controllers 240 together with one or more cluster hosts 210, 220, and 225 connected to each storage controller 240.

In some embodiments, the system memory 243 of storage controller 240 includes operation software 250 and stores program instructions and data which the processor 242 may access for executing functions and method steps associated with executing the steps and methods of the present invention. As shown in FIG. 2, system memory 243 may also include or be in communication with a cache 245, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 may be implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

The storage controller 240 may include a data management module 112. The data management module 112 may work in conjunction with each and every component of the storage controller 240, the hosts 210, 220, 225, and other storage controllers 240 and hosts 210, 220, and 225 that may be remotely connected via the storage fabric 260. Data management module 112 may be structurally one complete module or may be associated and/or included with other individual modules. Data management module 112 may also be located in the cache 245 or other components of the storage controller 240.

The storage controller 240 includes a control switch 241 for controlling a protocol to control data transfer to or from the host computers 210, 220, 225, a microprocessor 242 for controlling all the storage controller 240, a nonvolatile control memory 243 for storing a microprogram (operation software) 250 for controlling the operation of storage controller 240, cache 245 for temporarily storing (buffering) data, and buffers 244 for assisting the cache 245 to read and write data, and the data management module 112, in which information may be set. The multiple buffers 244 may be implemented to assist with the methods and steps as described herein.

Figure 3:
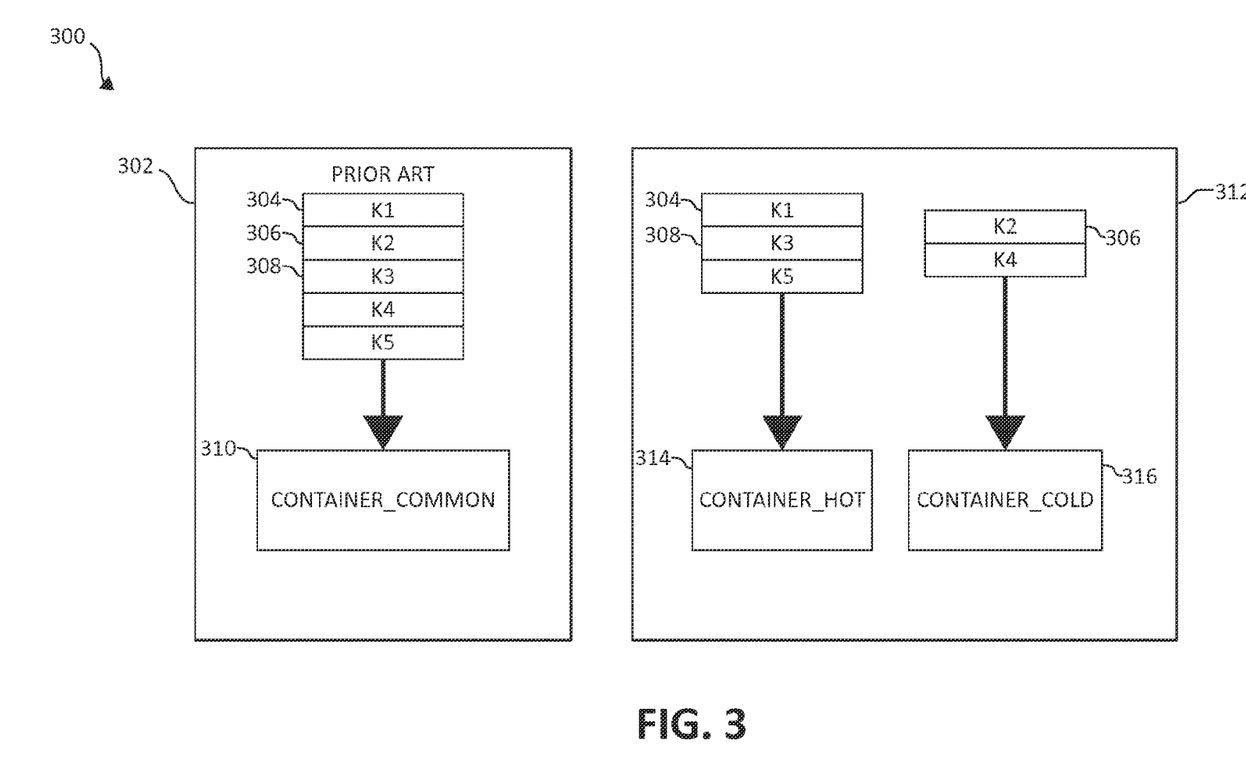
FIG. 3 is a block diagram of an exemplary conventional data management methodology and an exemplary data management methodology in accordance with various aspects of the present invention.

Turning now to FIG. 3, a block diagram 300 of a conventional data management methodology 302 is shown alongside a data management methodology 312 in accordance with the present invention, here in which various aspects of the illustrated embodiments are shown. Returning first to block 302, various key value pairs 304 (corresponding to K1), 306 (corresponding to K2), and 308 (corresponding to K3) are maintained in a common data storage container 310. In contrast, and in reference to block 312, the various key value pairs have been analyzed from a data heat standpoint to determine whether the data manifests itself as hot or cold data. Key value pairs K1 (304), K3 (308) and K5 have been determined to manifest a data heat above a certain threshold, and are organized and placed into a separate hot data storage container 314 as shown. Similarly, key value pairs K2 (306) and K4 have been determined to manifest data heat below the threshold (e.g., they are cold), and are therefore separated and placed into a separate, cold data container 316 as shown.

Figure 4:
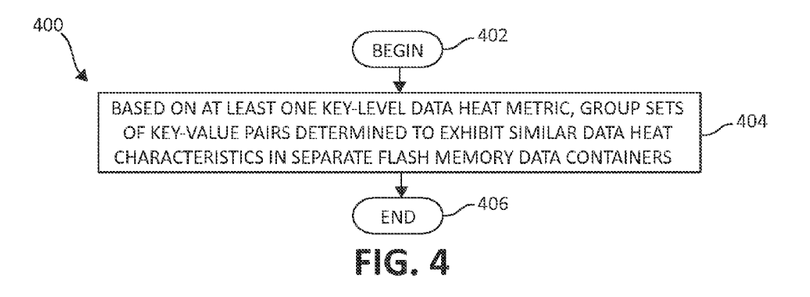
FIG. 4 is a flow chart diagram illustrating an exemplary method for increased efficiency in data management in a computing storage environment, again in which aspects of the present invention may be realized.

Turning now to FIG. 4, a flow chart diagram, illustrating a generalized method 400 for data management in view of various aspects of the present invention (e.g., for example, the previously shown embodiment in FIG. 3, previously), is depicted. Method 300 begins (step 302). Based on at least one key-level data heat metric, sets of key-value pairs determined to exhibit similar data heat characteristics are grouped. Those key-value pairs exhibiting a hotter data heat characteristic are placed into a separate flash memory data container than those key-value pairs exhibiting a colder data heat characteristic (step 304). The method 300 then ends (step 306).

In many data management mechanisms, log-structured writes may be performed, where a so-called "Log-structured merge" (LSM) tree, or a data structure with performance characteristics attractive for providing indexed access to data with high insert volume, such as transactional log data, may be implemented. Log structured merge trees are often desirable especially on flash-based systems since the log-structured data storage mechanism aligns with performance characteristics of flash. Log-structured merge, avoids update-in-place operations that incur space and write amplification penalties on flash. However, LSM data organization must perform a garbage collection operation to reclaim space as updates, deletes and reorganization operations result in garbage (i.e. space not occupied by useful data). Hot key-value pairs that are frequently updated result in higher garbage collection overhead compared to cold key-value pairs that are infrequently updated. However, co-locating hot and cold keys amplifies the cost of garbage collection as cold keys co-located with hot keys on a region being garbage collected must be relocated to in order to reclaim the underlying space.

Therefore, separating hot and cold keys on to separate containers provides the advantage that the garbage collection cost is lower as the amount of data moved during the garbage collection operation is reduced.

When such LSM operations are performed, various deletes, updates, and data reorganization results in data space that needs to be garbage collected, in order to maintain system performance and storage efficiencies. In the conventional case, however, the granularity typically performed in garbage collection operations exceeds write record sizes.

In these conventional cases, co-location of hot/cold data on the same "block" and flushing in a subsequent garbage collection process may result in several disadvantages. First, in the case of flash memory, for example, there may be higher garbage collection overhead due to flash erase characteristics. The garbage collection process may need to be performed at a key-value layer in order to address space fragmentation issues. Various performance penalties may result due to data movements (e.g., reads, modifies, and writes). In addition, the counter may need to be frequently updated, which may incur the consumption and/or dedication of various system resources.

In contrast to conventional techniques, and as the various aspects of FIGS. 3 and 4 suggest, for example, the mechanisms of the illustrated embodiments perform flash-optimized key value store data management. In key/value stores, key-level access statistics are maintained, and separate hot and cold key-value pairs are placed in separate blocks/containers. This functionality, among other benefits, results in more efficient garbage collection operations, and more efficient data placement in multi-tiered storage environments.

Figure 5:
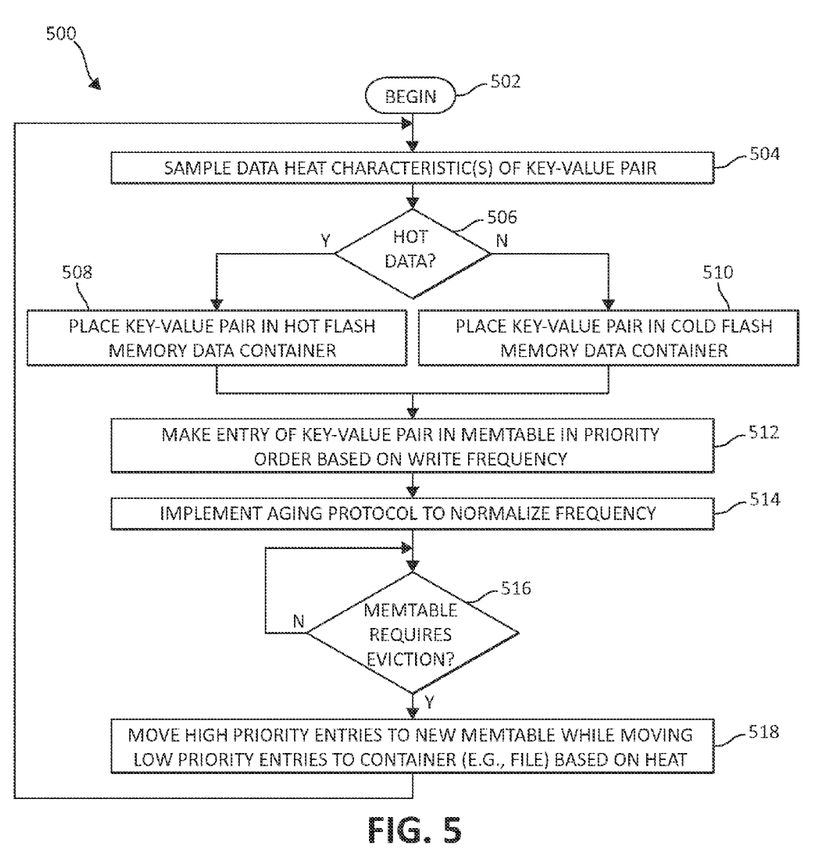
FIG. 5 is an additional flow chart diagram illustrating an exemplary method for performing various operations for data management enhancement, again in which aspects of the present invention may be implemented.

In view of the forgoing, consideration is now made to FIG. 5, following, which illustrates in greater detail, several aspects of the mechanisms of the present invention. Method 500 begins (step 502), by sampling data heat characteristic(s) of a representative key-value pair (step 504). These data heat characteristics may vary depending on factors known to one of ordinary skill in the art, but also may include such metrics as update frequency, access frequency, and arrival time, for example. Some key-value pairs may be updated very frequently (hourly or by minute), whereas other key-value pairs may be rarely updated. Different containers may be assigned to various key-value pairs based on heat.

Moving to step 506, if the data, after being considered under the foregoing, is determined to be hot data (e.g., a tweet) (step 506), the hot key-value pair is placed in a hot flash memory data container (step 508). Returning to step 506, if the key-value pair is determined to be cold, it is placed in a cold flash memory data container (step 510).

As one of ordinary skill in the art will appreciate, however, various other embodiments of the functionality presently described may be implemented in a particular system. For example, a number of flash memory log-structured data containers may be maintained. Each of these containers may correspond to a certain temperature in an overall heat gradient of data characteristics. Those key-value pairs that are determined to have similar data heat characteristic(s) may then be placed in the same container. Here again, as one of ordinary skill in the art will appreciate, the determination of what data heat characteristics are "similar" may vary according to a particular implementation. For example, the determination of similar data heat characteristics may include a determination that the data heat of various key-value pairs falls within a certain predetermined threshold of one or more data heat characteristics. Moreover, the grouping of key-value pairs may be performed on key-value pairs of any conceivable size.

Returning now to the depicted embodiment shown in FIG. 5, in a following step 512, an entry of the respective key-value pair is made in a memtable in priority order based on write frequency (step 512). In a following step 514, an aging protocol is implemented to normalize the write frequencies.

In a following decision step 516, if the memtable requires an eviction operation, the high priority entries are moved to a new memtable while low priority entries are moved to a container (e.g., file) based on heat (step 518). The method 500 then returns to step 504 as shown.

As the various aspects of FIG. 5 indicate, higher priority entries will tend to remain in memory and as a result, the higher priority entries are not subsequently subjected to a garbage collection procedure. However, as those entries are overwritten in memory, the applicable log entries may become invalid; in this situation those entries may be also garbage collected. One possible mechanism to address the collection of aging entries, in one embodiment, is the implementation of a larger log to provide sufficient time for the in-memory entries to be overwritten.

It should be noted that if those entries are not overwritten, the entries will be flushed in the next memtable write (e.g., to SSD), and the log can be garbage collected as usual. As a result, the probability that valid entries will necessitate movement in the log is low, and may be controlled with the rate at which the memtable entries are flushed, as well as the garbage collection flow of the applicable log. This way, the write amplification overhead due to the implementation of a log is kept low, while performance benefits are provided to operations such as frequent counter update operations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for flash-optimized data placement in multi-tiered log-structured storage systems by a processor, comprising:
   based on at least one key-level data heat metric, grouping sets of key-value pairs determined to exhibit similar data heat characteristics; wherein those key-value pairs exhibiting a hotter data heat characteristic are placed into a separate flash memory log-structured data container than those key-value pairs exhibiting a colder data heat characteristic, the at least one key-level data heat metric including at least an update frequency or an arrival time of a respective key-value pair;
   maintaining the grouped sets of key-value pairs as entries in a memtable, wherein an entry of each respective key-value pair is made in the memtable according to a priority order based on a write frequency of each respective key-value pair; and
   upon determining the memtable requires an eviction operation, migrating higher priority entries from the memtable into a new memtable.

2. The method of claim 1, wherein grouping sets of key-value pairs includes maintaining multiple flash memory log-structured data containers corresponding to a varying heat gradient, wherein those key-value pairs determined to be exhibiting similar heat characteristics are placed into the same one of the multiple data containers.

3. The method of claim 1, wherein grouping sets of key-value pairs includes performing the grouping for key-value pairs of any data size.

4. The method of claim 1, further including establishing the at least one key-level data heat metric as a function of an access frequency of the respective key-value pair.

5. The method of claim 4, further including monitoring the respective key-value pair over time to determine a data heat characteristic for the respective key-value pair.

6. The method of claim 1, further including performing at least one of:
   implementing an aging protocol for the entries, wherein lower priority entries are evicted to a particular memory data container based on at least one of the data heat characteristics, and
   flushing the entries in the memtable.

7. A system for flash-optimized data placement in multi-tiered log-structured storage systems, comprising:
   a processor, in operable communication in the multi-tiered storage system, wherein the processor, based on at least one key-level data heat metric, groups sets of key-value pairs determined to exhibit similar data heat characteristics; wherein those key-value pairs exhibiting a hotter data heat characteristic are placed into a separate flash memory log-structured data container than those key-value pairs exhibiting a colder data heat characteristic, the at least one key-level data heat metric including at least an update frequency or an arrival time of a respective key-value pair;
   maintains the grouped sets of key-value pairs as entries in a memtable, wherein an entry of each respective key-value pair is made in the memtable according to a priority order based on a write frequency of each respective key-value pair; and
   upon determining the memtable requires an eviction operation, migrates higher priority entries from the memtable into a new memtable.

8. The system of claim 7, wherein the processor, pursuant to grouping sets of key-value pairs, maintains multiple flash memory log-structured data containers corresponding to a varying heat gradient, wherein those key-value pairs determined to be exhibiting similar heat characteristics are placed into the same one of the multiple data containers.

9. The system of claim 7, wherein the processor, pursuant to grouping sets of key-value pairs, performs the grouping for key-value pairs of any data size.

10. The system of claim 7, wherein the processor establishes the at least one key-level data heat metric as a function of an access frequency of the respective key-value pair.

11. The system of claim 10, wherein the processor monitors the respective key-value pair over time to determine a data heat characteristic for the respective key-value pair.

12. The system of claim 7, wherein the processor at least one of:
   implements an aging protocol for the entries, wherein lower priority entries are evicted to a particular memory data container based on at least one of the data heat characteristics, and
   flushes the entries in the memtable.

13. A computer program product for flash-optimized data placement in multi-tiered log-structured storage systems by a processor, the computer program product comprising a computer-readable storage medium having computer-readable program code portions stored therein, the computer-readable program code portions comprising:

a first executable portion that, based on at least one key-level data heat metric, groups sets of key-value pairs determined to exhibit similar data heat characteristics; wherein those key-value pairs exhibiting a hotter data heat characteristic are placed into a separate flash memory log-structured data container than those key-value pairs exhibiting a colder data heat characteristic, the at least one key-level data heat metric including at least an update frequency or an arrival time of a respective key-value pair;

maintains the grouped sets of key-value pairs as entries in a memtable, wherein an entry of each respective key-value pair is made in the memtable according to a priority order based on a write frequency of each respective key-value pair; and upon determining the memtable requires an eviction operation, migrates higher priority entries from the memtable into a new memtable.

14. The system of claim 13, further including a second executable portion that, pursuant to grouping sets of key-value pairs, maintains multiple flash memory log-structured data containers corresponding to a varying heat gradient, wherein those key-value pairs determined to be exhibiting similar heat characteristics are placed into the same one of the multiple data containers.

15. The system of claim 13, further including a second executable portion that, pursuant to grouping sets of key-value pairs, performs the grouping for key-value pairs of any data size.

16. The computer program product of claim 13, further including a second executable portion that establishes the at least one key-level data heat metric as a function of an access frequency of the respective key-value pair.

17. The computer program product of claim 16, further including a third executable portion that monitors the respective key-value pair over time to determine a data heat characteristic for the respective key-value pair.

18. The computer program product of claim 13, further including a second executable portion that performs at least one of:

implementing an aging protocol for the entries, wherein lower priority entries are evicted to a particular memory data container based on at least one of the data heat characteristics, and flushing the entries in the memtable.

* * * * *